US007963026B2

(12) United States Patent
Boardman

(10) Patent No.: US 7,963,026 B2
(45) Date of Patent: Jun. 21, 2011

(54) METHOD OF FORMING AN ELECTRICAL HEATING ELEMENT

(76) Inventor: Jeffery Boardman, Appleton (GB)

( * ) Notice: Subject to any disclaimer, the term of this patent is extended or adjusted under 35 U.S.C. 154(b) by 1093 days.

(21) Appl. No.: 11/575,514

(22) PCT Filed: Oct. 14, 2005

(86) PCT No.: PCT/GB2005/003949

§ 371 (c)(1), (2), (4) Date: Mar. 19, 2007

(87) PCT Pub. No.: WO2006/043034

PCT Pub. Date: Apr. 27, 2006

(65) Prior Publication Data

US 2008/0075876 A1 Mar. 27, 2008

(30) Foreign Application Priority Data

Oct. 23, 2004 (GB) .................................. 0423579.2

(51) Int. Cl.
*H05B 3/00* (2006.01)
*B23P 19/00* (2006.01)

(52) U.S. Cl. ............ 29/611; 29/610.1; 29/745; 29/846; 338/308; 438/10

(58) Field of Classification Search ................. 29/610.1, 29/611, 846, 745; 338/308; 438/10
See application file for complete search history.

(56) References Cited

U.S. PATENT DOCUMENTS

| | | | | |
|---|---|---|---|---|
| 3,261,082 | A * | 7/1966 | Maissel et al. | 29/620 |
| 4,210,996 | A * | 7/1980 | Amemiya et al. | 29/610.1 |
| 4,606,781 | A * | 8/1986 | Vyne | 438/10 |
| 4,782,202 | A | 11/1988 | Sawae et al. | |
| 4,870,472 | A * | 9/1989 | Vyne | 338/92 |
| 5,466,484 | A * | 11/1995 | Spraggins et al. | 438/385 |
| 5,635,893 | A * | 6/1997 | Spraggins et al. | 338/48 |
| 5,679,275 | A * | 10/1997 | Spraggins et al. | 219/505 |
| 6,010,754 | A * | 1/2000 | Tatsumi | 427/545 |
| 6,097,276 | A * | 8/2000 | Van Den Broek et al. | 338/9 |
| 7,249,409 | B2 * | 7/2007 | Landsberger et al. | 29/610.1 |

FOREIGN PATENT DOCUMENTS

| | | | |
|---|---|---|---|
| FR | 2676420 | A | 11/1992 |
| GB | 992464 | A | 5/1965 |

* cited by examiner

*Primary Examiner* — C. J Arbes
(74) *Attorney, Agent, or Firm* — David A. Guerra

(57) ABSTRACT

A method for forming an electrical heating element by flame spraying a metal/metallic oxide matrix, wherein a flame sprayed metal/metallic oxide matrix is deposited onto an insulating or conductive substrate such as to have a higher resistance than is required for a designed use, and an intermittently pulsed high voltage DC supply is applied across the matrix such as to produce continuous electrically conductive paths through the matrix which permanently increase the overall conduction and simultaneously reduce the overall resistance of the metal/metallic matrix to achieve a desired resistance value.

21 Claims, 1 Drawing Sheet

METHOD OF FORMING AN ELECTRICAL HEATING ELEMENT

CROSS-REFERENCE TO RELATED APPLICATIONS

Figure 1:
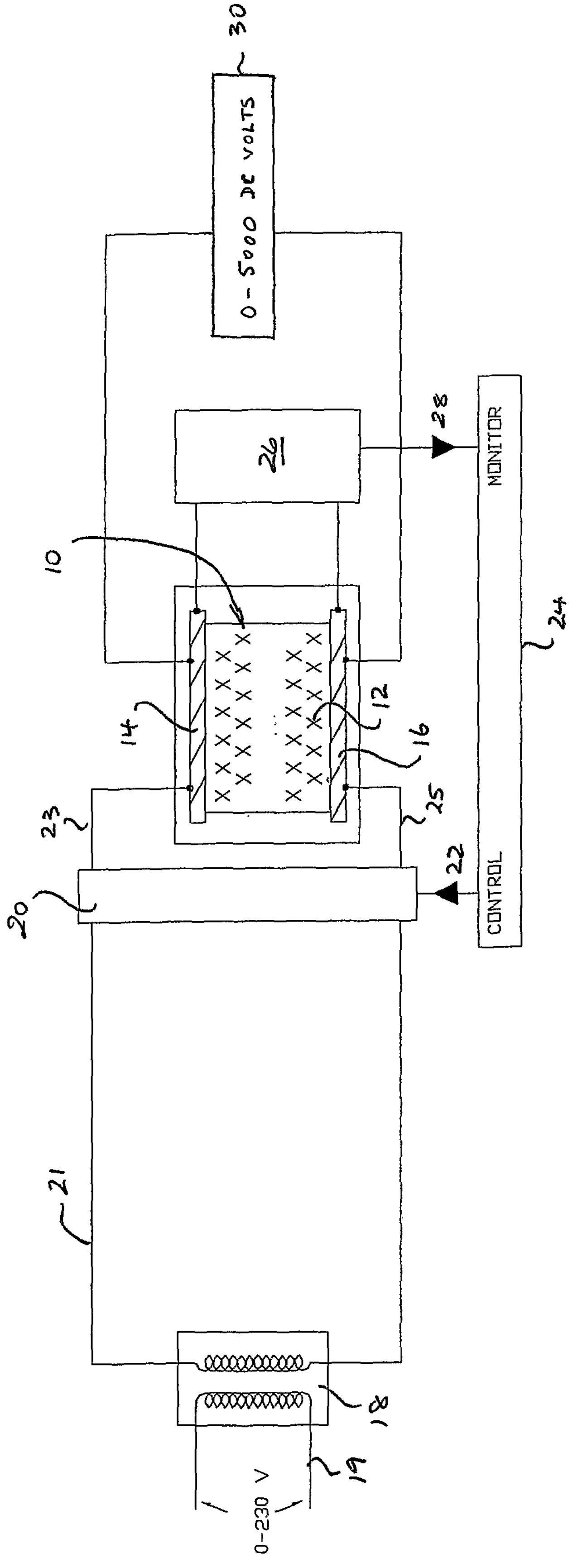

This application is an U.S. national phase application under 35 U.S.C. §371 based upon co-pending International Application No. PCT/GB2005/003949 filed on Oct. 14, 2005. Additionally, this U.S. national phase application claims the benefit of priority of co-pending International Application No. PCT/GB2005/003949 filed on Oct. 14, 2005, and Great Britain Application No. 0423579.2 filed on Oct. 23, 2004. The entire disclosures of the prior applications are incorporated herein by reference. The international application was published on Apr. 27, 2006 under Publication No. WO 2006/043034 A1.

The present invention relates to methods of production of electrical heating elements using flame spraying.

It is an essential requirement of all commercial electrical heating element production processes that successive elements being produced are manufactured to the same required electrical resistance within as close a tolerance as possible.

The conventional technique for the production of electrical heating elements has been based on the use of resistance alloys, usually in strip or wire form.

In general, conventional heating elements which are manufactured utilising resistance alloys in strip or wire form have been produced within a resistance tolerance of plus or minus five percent of the required resistance pertaining to a particular element design. However, with improvements in automated production techniques the manufacturing tolerance for conventional electrical resistance heating elements has recently improved to the point where tolerance of plus or minus two and half percent of a required resistance value are commonplace.

From GB 0992464A there is known a technique of using pulsed voltages to change the crystalline structure of thin, sputtered metallic films of tantalum. Such sputtered films, when initially deposited have random crystalline structures, usually consisting of a polycrystalline type with a great many grain boundaries. The electrical resistance of such films is proportional to the number of grain boundaries within the polycrystalline metal matrix. The more grain boundaries, the higher is the resistance. The basis of GB 0992464A is that heat may be used to initially "normalise" the polycrystalline structure, in the form of an annealing process, which recrystallises the film, reducing the number of grain boundaries and consequently the electrical resistance. Annealing/normalising processes are not precise and so the sputtered films are heat treated to a limited extent until sufficient recrystallisation has taken place to reduce the resistance to a level slightly above the required finished value. The sputtered film is then subjected to a series of high voltage pulses. The effect of these high voltage pulses is to create very localised heating at the points of highest resistance within the crystalline film, i.e. at the grain boundaries and in fact to locally anneal the film, reducing the number of grain boundaries. The basis behind the use of these high voltage pulses is thus to generate very localised areas of heating within the film, producing an annealing/normalising heating effect on a micro scale and in so doing to change the crystalline structure of the metallic film. The effect of heating the resistor above its normal stabilising temperature is said to "increase the film resistivity" probably "as a result of (causing) oxidation to the film, both at its surface and along its grain boundaries".

From JP 10032951A it is known that a pulsed high voltage supply can be used in the continuous operation of a small thick film heating device as applied to a print head. Although not explicitly stated, it seems likely that the thermal heating elements described in JP 10032951A are made from a semi conductive material screen printed on to an alumina dielectric substrate. The resistance of such devices decreases with increase in temperature and accurate temperature control of small circuits is difficult. The technique of JP 10032951A is to define a method of using a dual voltage supply as a means of continuously controlling the resistance during operation of the heating device and hence the thermal output and the temperature of the heating elements used to heat the print head. Initial power to the heating elements is from a constant current supply whereby under OHM's Law, the heat output is $I^2R$ and for a constant current supply I, when the resistance R is kept at a uniform level, the heating output is relatively constant. JP 10032951A is therefore concerned with a method of keeping the resistance of the variable resistance semi conductive heating elements constant by:

1. Applying a constant current supply to the elements which will provide a level of heat output according to the resistance of the elements and is at a lower level than ideally required; and
2. Applying additional electrical energy in the form of high voltage pulses, continuously, and at a level and rate sufficient to keep the resistance of the print head heaters constant—thus ensuring constant temperature in operation.

Alternative techniques for the production of electrical heating elements have become available recently which involve depositing flame sprayed metal oxides onto either insulating or conductive substrates. These include element types wherein the electrical current travels laterally through the resistive oxide deposit from one electrical contact to a second, referred to as Type One elements, and also those element types wherein the electrical current travels vertically through the thickness of the resistive oxide from one contact surface to another, referred to as Type Two elements, and additionally to those elements wherein the original resistive oxide layer is combined with a second oxide layer having self-regulating properties and the electrical current flows from one contact surface through the thickness of both above-mentioned oxide layers, which act thereby as resistances in series, to a second contact surface, and referred to as Type three elements.

It is essential that the equivalent electrical resistance heating elements, produced by the process of flame spray deposition of resistive metal oxides, are capable of being manufactured to the same tolerances to gain ready acceptance in the same commercial markets.

With conventional electrical resistance heating elements it is easily demonstratable that, for a particular design of the resistance alloy wire or strip being utilised, the resistance of such wires or strips is directly dependent upon the weight of material utilised in a particular element.

The same principle applies to elements manufactured by the flame spray deposition of metal oxides. However, it became apparent to the present inventor from a prolonged series of empirical trials that whereas the weight of successive electrical elements produced by the flame spray deposition of metal oxides could be held within tolerances better than plus or minus one percent, the as sprayed resistances varied by as much as plus or minus ten percent of a required design value. Furthermore, resistance variation did not coincide with weight variances, but seemed to be independent.

Intense consideration was given to several possible empirical methods of controlling the various production process parameters, by measuring the resistance of successive elements during the manufacturing procedure and stopping the process once each element had reached the specified resistance level.

Whilst this approach worked to a degree, it was not fully successful and was not considered to be applicable to high volume, mass production processes.

An alternative methodology has been discovered, based upon modifying the method of conduction through the resistive oxide matrix.

It is a widely accepted and easily demonstrable fact that for a given length of conventional resistance alloy material in wire or strip form, the greater the cross sectional area the lower is the resistance, and conversely the greater the conductivity. The accepted reason for this fact is that the greater cross sectional area provides more conductive paths for electrons to move through the alloy crystalline matrix.

The same principle applies to elements produced by the flame spray deposition of metal oxides.

However, a metallurgical examination of the cross section of a flame sprayed metal oxide matrix shows it to be comprised of areas of metal surrounded by areas of the appropriate oxide and that the probable conductive paths through such a matrix are from one metal area to successive ones via the intervening layers of oxide.

Generally, the metal oxides situated between the metal areas are, in their pure forms, insulators at ambient temperatures, and on this basis the as-sprayed metal/metal oxide matrices so formed should not exhibit the conductive properties at low voltages, such as 240 vac at ambient temperatures, which are characteristic of them. Detailed empirical and theoretical work has shown that the method of conduction within the flame sprayed metal/metal oxide matrices is most probably due to the presence of free electrons within the oxide layers surrounding the metallic areas which have migrated from the said metallic areas creating a force field within the oxide, and that where these force fields overlap or impinge, electrons will flow in the direction of an applied voltage.

The migration of free electrons from metallic areas into the surrounding oxide matrices most probably arises from the fact that the work functions of the metals comprising the metallic areas are substantially less than those of the oxides comprising the surrounding matrices. Additionally, the oxides which comprise the oxide matrices surrounding the metallic areas are not stoichiometric in composition and neither is the crystalline matrix structure a regular one. The process of flame spraying depends upon a molten, or semi-molten, particle being projected onto a surface where it deforms to interlock with other particles and is rapidly quenched.

It is entirely feasible therefore that the random polycrystalline metal/metal oxide structures produced by the flame spray deposition are not under electronic equilibrium conditions and as a consequence the differences in work functions between the metal and metallic oxides causes electrons to migrate outwards from the metal areas into the metallic oxide matrices, producing an electronic force field and that the density of electronic migration is dependent upon the differences in the respective work functions. It is also entirely feasible that the conductivity of the flame sprayed metal/metal oxide matrices is dependent upon the number of adjacent or overlapping electronic force fields within the flame sprayed metal oxide matrix.

It is also entirely feasible that flame sprayed metal/metal oxide matrices may be produced where there are insufficient adjacent overlapping electronic force fields, and in consequence the conductivity is too low, or conversely the resistance is too high, for a given metal/metallic oxide volume and that a methodology may be utilised to allow these separated force fields within the metallic oxide matrix volume to become inter-connected, thus increasing the conductivity of the metallic oxide matrix to the desired level for a particular design of electrical resistance heating element being manufactured by said flame spray deposition process and utilising a pre-determined volume of metal/metallic oxide.

In accordance with a first aspect of the present invention there is provided a method for forming an electrical heating element by flame spraying a metal/metallic oxide matrix, wherein a flame sprayed metal/metallic oxide matrix is deposited onto an insulating or conductive substrate such as to have a higher resistance than is required for a designed use, and an intermittently pulsed high voltage DC supply is applied across the matrix such as to produce continuous electrically conductive paths through the matrix which permanently increase the overall conduction and simultaneously reduce the overall resistance of the metal/metallic matrix to achieve a desired resistance value.

It is believed that the initial higher than desired resistance of the flame sprayed metal/metallic oxide matrix, as applied to either an insulating or conductive substrate, is the result of there being insufficient adjacent or overlapping force fields within the oxide matrix to provide the required conductivity and resistance, for the particular design and configuration of electrical resistance heating element for which the flame sprayed metal/metallic oxide matrix is intended.

It is believed that the conductive electrical paths between the separate force field volumes in the metal/metallic oxide matrix provide a form of electron tunnelling through the crystalline oxide matrix between successive conductive force field volumes within the oxide matrix.

The prevailing resistance of the metal/metallic oxide matrix can be determined by applying a second continuous DC voltage to the matrix in the direction in which the particular configuration of oxide matrix is intended to operate as an electrical resistance heating element and determining the resistance from OHM's Law calculations based on the values of continuously applied DC voltage and resulting current flow.

Preferably, this DC voltage is applied at a level in the range from ten to one hundred percent more than the designed operating level of the resulting electrical resistance element.

It has been found that the number of conductive paths between successive conductive force field volumes within the crystalline oxide matrix produced by the application of an intermittent pulsed high voltage DC source is directly proportional to and dependent upon the value of the high voltage DC source applied to the flame sprayed crystalline metal/metallic oxide matrix.

It has also been found that the number of conductive paths between successive conductive force field volumes within the metallic oxide matrix is not only dependent upon the value of the aforementioned high voltage DC source, but also on the number and rate at which the intermittent high voltage pulses are applied to the flame sprayed metal/metallic oxide matrix from this high voltage DC source.

It has further been found that the higher the level of the high voltage DC source applied to the metal/metallic oxide matrix and the greater the frequency and number of pulses initiated, the higher is the rate at which the overall conductive properties of the metal/metallic oxide matrix increase.

The rate of generation of conductive paths between successive conductive force fields within the metal/metallic oxide matrix has been found to be influenced also by the continuous application of said second DC voltage to the oxide matrix at a level greater than that at which the particular design and configuration of metal/metallic oxide is designed to operate as an electrical resistance heating element.

Preferably, the level of the second continuously applied DC voltage is higher than the intended operating voltage of the particular design and configuration of electrical resistance heating element produced by the flame spray deposition of a metal/metallic oxide matrix by values of between ten percent and one hundred percent.

The above-described method may be applied to flame sprayed metal/metallic oxide matrices irrespective of the direction of applied operating voltages, or whether the oxide matrices are applied to insulated or conductive substrates, or whether two or more oxide matrices are combined as resistance in series or parallel.

One preferred embodiment of the present method comprises the steps of:

(a) applying a first continuous DC voltage to the metal/metallic oxide matrix in the direction in which the particular configuration of metal/metallic oxide matrix is intended to operate as an electrical resistance heating element;

(b) determining the resistance of the metal/metallic matrix from OHM's Law calculations based on the values of the continuously applied DC voltage and resulting current flow;

(c) applying a second DC voltage source to the metal/metallic oxide matrix in the same direction as the continuously applied DC voltage referred to in step (a), the second DC voltage being applied to the flame sprayed metal/metallic oxide matrix in a series of high frequency intermittent pulses to produce conductive paths between the successive conductive force field volumes situated within the metal/metallic oxide matrix and cause the overall conductivity of the metal/metallic oxide matrix to increase, with corresponding decrease in overall resistance; and (d) continuously monitoring the increase in the current flowing through the metal/metallic oxide matrix by virtue of said first, continuously applied DC voltage, until a calculation using OHM's Law demonstrates that the overall resistance of the flame sprayed metal/metallic oxide matrix is at the precise value required for that particular design and configuration of flame sprayed deposited metal/metallic oxide matrix to operate as an electrically resistive heating element, and at this stage turning off both DC voltage supplies to the metal/metallic oxide matrix.

Preferably, the first continuous DC voltage is applied at a level ranging from ten to one hundred percent more than the designed operating level of the particular design or configuration of electrical resistance heating element.

Advantageously, the second DC voltage is applied such that the live and neutral contacts for both DC voltage sources are coincident.

Preferably, the second DC voltage source is set at a level between 500 and 5000 volts.

Thus, by way of example the level of the intermittently applied second DC voltage may be initially set at a low level of, say, 500 volts and progressively increased during steps (c) and (d) to a level of, say, 5000 volts, or higher, as required by the different resistivities of the different metal/metallic oxide combinations produced by the flame spray deposited metal/metallic oxide matrices.

The equipment utilised to apply varying numbers and rates of the second, pulsed high level DC voltage may be of any form, ranging for example from manually operated switches to solid state and/or capacitive devices.

By the use of the aforegoing method, electrically resistive heating elements of different powers and resistances, but of identical design and configuration, may be derived and produced from variations of the voltages and pulsing frequencies set out in steps (a) to (d).

The flexibility of the methodology of modifying the conductivity of flame sprayed metal/metallic oxide matrices as described hereinbefore enables the production of flame sprayed electrical resistance elements of all pre-mentioned types to be manufactured utilising less complex automated control equipment than would otherwise be required, with resulting cost advantages.

Advantageously, the continuous application of a DC voltage at a higher level to the metal/metallic oxide matrices than is required for operation of said matrices as electrical resistance elements can act as a form of proving test ensuring that the resulting electrical resistance elements will work satisfactorily over prolonged periods at the required lower operating voltage.

The increase in conductivity of flame sprayed metal/metallic oxide matrices deriving from the methodology described hereinbefore may be further increased, if required, by re-applying the methodology but at higher voltage levels and pulse frequencies.

Advantageously, the methodology for modifying the conductivity and resistance of the flame sprayed deposited metal/metallic oxide matrices intended for use as electrical resistance heating elements may be applied as a rapid computer controlled process, independent of the flame spray element manufacturing process.

According to a second aspect of the invention there is provided an apparatus for manufacturing an electrical heating element, comprising:

(a) means for depositing a metal/metallic oxide matrix onto an insulating or conductive substrate by flame spraying, such that the matrix has initially a higher resistance than is required for a designed use of the heating element;

(b) means for applying a first, continuous DC voltage to the metal/metallic oxide matrix in the direction in which the particular configuration of metal/metallic oxide matrix is intended to operate as an electrical resistance heating element;

(c) means for determining the resistance of the metal/metallic matrix from OHM's Law calculations based on the values of the continuously applied DC voltage and resulting current flow;

(d) means for applying a second DC voltage source to the flame sprayed metal/metallic oxide matrix in the same direction as the continuously applied first DC voltage, and in a series of high frequency intermittent pulses to cause the overall conductivity of the metal/metallic oxide matrix to increase, with corresponding decrease in overall resistance; and (e) means for monitoring the increase in the current flowing through the metal/metallic oxide matrix by virtue of the continuously applied first DC voltage until a calculation using OHM's Law demonstrates that the overall resistance of the flame sprayed metal/metallic oxide matrix has been reduced to a value required for that particular design and configuration of flame sprayed deposited metal/metallic oxide matrix.

The invention is described further hereinafter, by way of example only, with reference to the accompanying drawings, in which:

FIG. 1 is a diagrammatic representation of one embodiment of a conditioning apparatus for use in performing the present invention.

FIG. 1 shows a typical sample 10 of an electrical heating element whose final operational resistance is to be established during its formation. The heating element in these cases comprises a substrate (not visible), which can be either conductive or non-conductive, carrying a layer of metal oxide 12 that has been deposited by flame spraying. As explained hereinbefore, it is found that such flame spraying produces areas of metal surrounded by areas of oxide in the resulting "oxide" layer 12. Metallic strips 14, 16 are formed/provided on opposite sides of the deposited oxide layer to enable electrical current to be passed through the latter layer.

An AC transformer 18 receives a variable AC input of 0-230 volts on its primary winding 19, the secondary winding 21 of this transformer presenting 0-5000 volts to a variable frequency pulsing switch 20 coupled to a control output 22 of a computer 24. The current in the secondary winding 21 of the transformer 18 is preferably limited to approximately 25 mA, but variable (0-25 mA) in 5 mA steps to result in a high voltage DC being presented across the sample 10 by the switch 20 via lines 23, 25.

Also connected across the sample 10 is a primary source of voltage 30 which can, for example, be 0-500 DC volts, with a current limit of 0-10 amps.

Finally, there is also connected across the sample 10 a resistance measuring means 26, using D.V.M., whose output is coupled at 28 to a monitoring input of the computer 24.

The computer is arranged to continuously monitor the resistance of the sample and to vary the applied DC pulsing voltage and the number of pulses.

In use, a metal/metallic oxide matrix is first applied to the insulating or conductive substrate by a flame spraying apparatus (not shown), which can itself be conventional, such that the matrix has initially a higher resistance than is required for a designed use of a heating element to be formed, the resistance measurement being made continuously by the resistance measuring means 26 and computer 24, preferably using OHM's Law calculations based on the values of the continuously applied DC voltage and resulting current flow.

The supply 30 applies a first, continuous DC voltage to the metal/metallic oxide matrix in the direction in which the particular configuration of metal/metallic oxide matrix is intended to operate as an electrical resistance heating element.

A second DC voltage is applied by the pulsing switch 22 to the flame sprayed metal/metallic oxide matrix in the same direction as the continuously applied first DC voltage in a series of high frequency intermittent pulses to cause the overall conductivity of the metal/metallic oxide matrix to increase, with corresponding decrease in overall resistance.

The computer 24 monitors the increase in the current flowing through the metal/metallic oxide matrix by virtue of the continuously applied first DC voltage and detects when the overall resistance of the flame sprayed metal/metallic oxide matrix has been reduced to a value required for that particular design and configuration of flame sprayed deposited metal/metallic oxide matrix. The application of the pulsed, second DC voltage to the oxide matrix is then caused by the computer to be discontinued.

The invention claimed is:

1. A method for forming an electrical heating element by flame spraying a metal/metallic oxide matrix, said method comprising the steps of:

(a) depositing a flame sprayed metal/metallic oxide matrix onto an insulating or conductive substrate such as to have a higher resistance than is required for a designed use; and (b) applying an intermittently pulsed high voltage DC supply across the matrix such as to produce continuous electrically conductive paths through the matrix which permanently increase the overall conduction and simultaneously reduce the overall resistance of the metal/metallic matrix to achieve a desired resistance value.

2. The method as claimed in claim 1, wherein the prevailing resistance of the metal/metallic oxide matrix is determined by applying a further continuous DC voltage to the matrix in the direction in which the particular configuration of oxide matrix is intended to operate as an electrical resistance heating element, and determining the resistance from OHM's Law calculations based on the values of continuously applied DC voltage and resulting current flow.

3. The method as claimed in claim 2, wherein said further DC voltage is applied at a level in the range from ten to one hundred percent more than the designed operating level of the resulting electrical resistance element.

4. The method as claimed in claim 1, further comprising the steps of:

c) applying a further continuous DC voltage to the metal/metallic oxide matrix in the direction in which the particular configuration of metal/metallic oxide matrix is intended to operate as an electrical resistance heating element;

d) determining the resistance of the metal/metallic matrix from OHM's Law calculations based on the values of said further continuously applied DC voltage and resulting current flow;

e) applying said intermittently pulsed high voltage DC supply to the metal/metallic oxide matrix in the same direction as said further continuously applied DC voltage and in a series of high frequency intermittent pulses so as to cause the overall conductivity of the metal/metallic oxide matrix to increase, with corresponding decrease in overall resistance; and f) continuously monitoring the increase in the current flowing through the metal/metallic oxide matrix by virtue of said further continuously applied DC voltage until a calculation using OHM's Law demonstrates that the overall resistance of the flame sprayed metal/metallic oxide matrix is at a value required for that particular design and configuration of flame sprayed deposited metal/metallic oxide matrix to operate as an electrically resistive heating element, and at this stage turning off both DC voltage supplies to the metal/metallic oxide matrix.

5. The method as claimed in claim 4, wherein said further continuous DC voltage is applied at a level ranging from ten to one hundred percent more than the designed operating level of the particular design or configuration of electrical resistance heating element.

6. The method as claimed in claim 5, wherein the intermittently pulsed DC voltage is applied such that the live and neutral contacts for both DC voltage sources are coincident.

7. The method as claimed in claim 6, wherein the intermittently pulsed DC voltage source is set successively at levels in a range lying between 500 and 5000 volts.

8. The method as claimed in claim 7, wherein the level of the intermittently applied DC voltage is initially set at a low level of the order of about 500 volts and progressively increased during steps e) and f) to a level of about 5000 volts or higher, as required by the different resistivities of the different metal/metallic oxide combinations produced by the flame spray deposited metal/metallic oxide matrices.

9. The method as claimed in claim 1, wherein the methodology for modifying the conductivity and resistance of the flame sprayed deposited metal/metallic oxide matrices intended for use as electrical resistance heating elements is applied as a rapid computer controlled process, independent of the flame spray element manufacturing process.

10. An apparatus for manufacturing an electrical heating element, comprising:

(a) means for depositing a metal/metallic oxide matrix onto an insulating or conductive substrate by flame spraying, such that the matrix has initially a higher resistance than is required for a designed use of the heating element;

(b) means for applying a first, continuous DC voltage to the metal/metallic oxide matrix in the direction in which the particular configuration of metal/metallic oxide matrix is intended to operate as an electrical resistance heating element;

(c) means for determining the resistance of the metal/metallic matrix from OHM's Law calculations based on the values of the continuously applied DC voltage and resulting current flow;

(d) means for applying a second DC voltage source to the flame sprayed metal/metallic oxide matrix in the same direction as the continuously applied first DC voltage, and in a series of high frequency intermittent pulses to cause the overall conductivity of the metal/metallic oxide matrix to increase, with corresponding decrease in overall resistance; and (e) means for monitoring the increase in the current flowing through the metal/metallic oxide matrix by virtue of the continuously applied first DC voltage until a calculation using OHM's Law demonstrates that the overall resistance of the flame sprayed metal/metallic oxide matrix has been reduced to a value required for that particular design and configuration of flame sprayed deposited metal/metallic oxide matrix.

11. The apparatus as claimed in claim 10, wherein said means for applying a second DC voltage source is a transformer in communication with a variable frequency pulsing switch.

12. The apparatus as claimed in claim 11, wherein said transformer presents 0-5000 volts to said variable frequency pulsing switch.

13. The apparatus as claimed in claim 10, wherein said metal/metallic oxide matrix further comprising metallic strips provided on opposite sides thereof to enable electrical current to be passed through the latter layer.

14. The apparatus as claimed in claim 13, wherein said metallic strips each being in electrical communication with said means for applying said first continuous DC voltage and with said means for applying said second DC voltage source.

15. A method for forming an electrical heating element by flame spraying a metal/metallic oxide matrix, said method comprising the steps of:

(a) depositing a flame sprayed metal/metallic oxide matrix onto an insulating or conductive substrate such as to have a higher resistance than is required for a designed use;

(b) applying a continuous DC voltage to the metal/metallic oxide matrix in the direction in which the particular configuration of metal/metallic oxide matrix is intended to operate as an electrical resistance heating element;

(c) determining the resistance of the metal/metallic matrix from OHM's Law calculations based on the values of said continuously applied DC voltage and resulting current flow;

(d) applying an intermittently pulsed high voltage DC supply to the metal/metallic oxide matrix in the same direction as said continuously applied DC voltage and in a series of high frequency intermittent pulses so as to cause the overall conductivity of the metal/metallic oxide matrix to increase, with corresponding decrease in overall resistance (e) producing continuous electrically conductive paths through the matrix by way of step (d) of applying intermittently pulsed high voltage DC supply across the matrix which permanently increase the overall conduction and simultaneously reduce the overall resistance of the metal/metallic matrix to achieve a desired resistance value; and (f) continuously monitoring the increase in the current flowing through the metal/metallic oxide matrix by virtue of said continuously applied DC voltage until a calculation using OHM's Law demonstrates that the overall resistance of the flame sprayed metal/metallic oxide matrix is at a value required for that particular design and configuration of flame sprayed deposited metal/metallic oxide matrix to operate as an electrically resistive heating element, and at this stage turning off both DC voltage supplies to the metal/metallic oxide matrix.

16. The method as claimed in claim 15, wherein step (a) further comprising the step of forming metallic strips on opposite sides of the deposited oxide layer to enable electrical current to be passed through the latter layer.

17. The method as claimed in claim 15, wherein said continuous DC voltage is applied at a level ranging from ten to one hundred percent more than the designed operating level of the particular design or configuration of electrical resistance heating element.

18. The method as claimed in claim 15, wherein said intermittently pulsed DC voltage is applied such that the live and neutral contacts for both DC voltage sources are coincident.

19. The method as claimed in claim 15, wherein said intermittently pulsed DC voltage source is set successively at levels in a range lying between 500 and 5000 volts.

20. The method as claimed in claim 15, wherein the level of the intermittently applied DC voltage is initially set at a low level of the order of about 500 volts and progressively increased during steps (b) and (c) to a level of about 5000 volts or higher, as required by the different resistivities of the different metal/metallic oxide combinations produced by the flame spray deposited metal/metallic oxide matrices.

21. The method as claimed in claim 15, wherein the methodology for modifying the conductivity and resistance of the flame sprayed deposited metal/metallic oxide matrices intended for use as electrical resistance heating elements is applied as a rapid computer controlled process, independent of the flame spray element manufacturing process.

* * * * *